United States Patent
Nissilä

(10) Patent No.: US 6,418,181 B1
(45) Date of Patent: Jul. 9, 2002

(54) METHOD AND MEASURING ARRANGEMENT FOR DETERMINING SPEED OF RUNNER, WALKER OR ANOTHER MOVING AND LIVING OBJECT

(75) Inventor: Seppo Nissilä, Oulu (FI)

(73) Assignee: Polar Electro Oy, Kempele (FI)

( * ) Notice: Subject to any disclaimer, the term of this patent is extended or adjusted under 35 U.S.C. 154(b) by 0 days.

(21) Appl. No.: 09/578,752

(22) Filed: May 25, 2000

(30) Foreign Application Priority Data

May 28, 1999 (FI) .................................................. 991223

(51) Int. Cl.[7] ............................................. G01C 21/00
(52) U.S. Cl. ........................ 377/23; 377/24.2; 235/105
(58) Field of Search ........................ 377/23, 24.1, 24.2; 235/105; 702/160

(56) References Cited

U.S. PATENT DOCUMENTS

| | | | | |
|---|---|---|---|---|
| 4,371,945 A | * | 2/1983 | Karr et al. .................. | 235/105 |
| 5,583,776 A | | 12/1996 | Levi et al. .................. | 701/217 |
| 5,689,099 A | * | 11/1997 | Domburg ..................... | 235/105 |
| 5,724,265 A | * | 3/1998 | Hutchings ................... | 235/105 |
| 5,891,042 A | | 4/1999 | Sham et al. ................. | 600/485 |

* cited by examiner

Primary Examiner—Tuan T. Lam
(74) Attorney, Agent, or Firm—Hoffmann & Baron, LLP

(57) ABSTRACT

The invention relates to a method and a measuring arrangement for determining the speed of a runner, walker or another moving and living object by a measuring arrangement. In the actual determination of speed during use the method comprises measuring at least one measurement variable which is directly or indirectly related to the object's stepping and dependent on the speed of movement of the moving and living object. An essential feature of the method is that, before the actual determination of speed during use, the dependence between the measurement variable and the speed is at least once taught to the measuring arrangement as a formula by means of user-specific teaching information, the formula being used for the actual determination of speed during use.

39 Claims, 8 Drawing Sheets

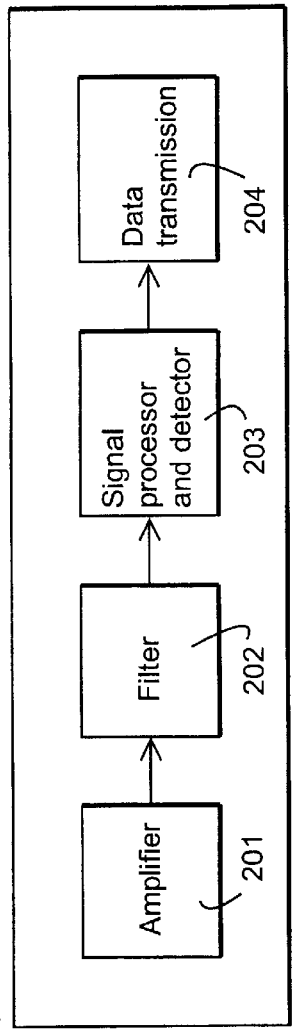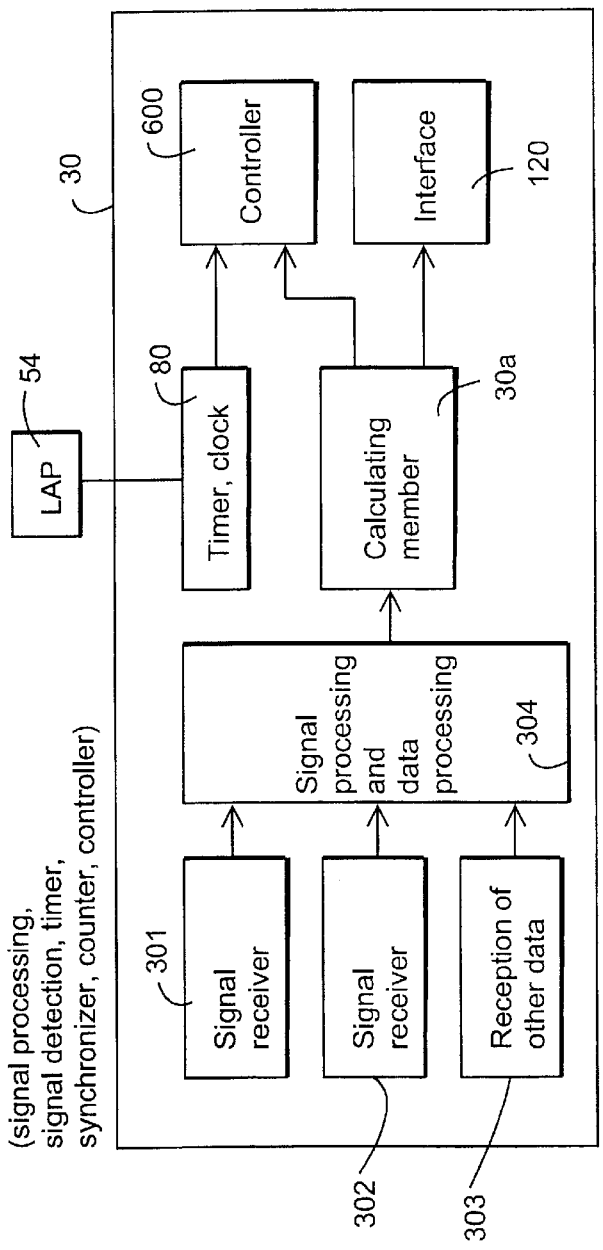
Fig. 4
Fig. 5

METHOD AND MEASURING ARRANGEMENT FOR DETERMINING SPEED OF RUNNER, WALKER OR ANOTHER MOVING AND LIVING OBJECT

BACKGROUND OF THE INVENTION

The invention relates to a method of determining the speed of a runner, walker or another moving and living object by a measuring arrangement, the method comprising measuring in the actual determination of speed during use at least one measurement variable which is directly or indirectly related to the object's stepping and dependent on the speed of movement of the moving and living object.

The invention relates to a method of determining the speed of a runner, walker or another moving and living object by a measuring arrangement, the method comprising measuring in the actual determination of speed during use at least one measurement variable which is directly or indirectly related to the object's stepping and dependent on the speed of movement of the moving and living object.

The invention also relates to a measuring arrangement for determining the speed of a runner, walker or another moving and living object, the measuring arrangement comprising a sensor for measuring at least one measurement variable, which is directly or indirectly related to the object's stepping and dependent on the speed of movement of the moving and living object.

The invention also relates to a measuring arrangement for determining the speed of a runner, walker or another moving and living object, the measuring arrangement comprising a sensor for measuring at least one measurement variable, which is directly or indirectly related to the object's stepping of the object and dependent on the speed of movement of the moving and living object.

There are several different prior art methods and measuring arrangements for measuring a person's speed.

One known method is to use a pedometer, i.e. a meter of the number of steps, into which the step size is fed as additional data, and thus the distance traveled is found out by multiplication. The speed is obtained by dividing the distance traveled by the measured elapsed time. A problem related to this is, however, that changes in the step length due to changes in the speed cannot be eliminated or taken into account. Furthermore, it is difficult to measure the step length accurately.

Another known method is to use the Doppler device, which is based on the transmission of radar waves and detection of the radar waves reflected from the object. This method is, however, expensive and has high power consumption. It is also sensitive to changes in the terrain and to interference sources in the vicinity.

A further method is to attach an acceleration sensor to the leg because the speed can be determined from the signal sent by the acceleration sensor by means of integration. Attachment of the acceleration sensor to the leg constitutes a problem because the coordinates of the acceleration sensor rotate resulting from the fact that the leg is not at a standard angle but the leg and thus also the acceleration sensor rotate. Only measuring rotation of the leg and the acceleration sensor, which would be very difficult in practice, could solve the problem.

In addition, it is known to use the acceleration sensor on the hips in combination with a neural network. The problem related to this method is that placing of the sensor exactly in the same spot as before in forthcoming measurements is difficult, and thus the acceleration signal obtained form the sensor will differ from that of the other measurements.

U.S. Pat. No. 5,891,042 disclose a pedometer provided with a heart rate measuring arrangement in which a microprocessor is programmed to perform several functions. In one function, known as the speed mode, the momentary or average speed of the object is calculated. In this solution the speed is, however, calculated in the same way as in conventional pedometers, i.e. the number of steps is obtained from the pedometer and when the step length is fed into the device, the device provides the distance traveled. When the device itself measures the elapsed time or this is fed into the device, the device calculates the speed on the basis of the distance traveled and the elapsed time. In this solution, as usual in pedometers, feeding of the step length is the only significant user-specific information which is used in the calculation of speed. Other user-specific information is not used for measuring the speed but only for forming an appropriate target zone for the user. The publication does not describe any option of teaching. In this prior art method it is impossible to consider the fact that the step length changes as the speed changes. Prior art devices do not contain nor are they provided with a sufficient amount of information on the dependence between the step time or another measurement variable able and the speed.

BRIEF DESCRIPTION OF THE INVENTION

The object of the invention is to provide a method and a measuring arrangement to eliminate the above-mentioned problems. The objects of the invention are achieved with a method and an arrangement that are characterized by what is disclosed in the independent claims. The dependent claims disclose preferred embodiments of the invention.

The invention is based on the idea that the measuring arrangement is provided with user-specific information for calculating the speed, which forms part of and/or specifies the formula which represents the dependence between. the measurement variable and the speed and is used for calculating the speed. In a more advance version of the invention, this information is teaching information, which is obtained as a result of several actual teaching measurements, in each of which the measurement pair consists of the measurement variable and the speed related thereto, for example. The measurement pair may also consist of the measurement variable and information from which the speed is obtained, i.e. the pair of the measurement variable consists of the time used for a certain known distance and the known distance. In this more advanced version the user of the measuring arrangement teaches the measuring arrangement a formula based on real user-specific measurements. The user creates a formula for the measuring arrangement by means of several, e.g. at least two, pairs of the measurement variable and the speed, i.e. in a way forms a curve representing the measurement variable and the speed, which can also be used for calculating speeds according to other values of the measurement variable in the actual measurements. The second version of the invention employs information which describes the user and specifies the dependence between the measurement variable and the speed set to the device e.g. at the factory, or by a wholesaler or a retailer. This means that the teaching has been carried out already at the factory, for example. In this second version the device is provided with complete formulae, which are kind of curves representing the measurement variable and the speed, and a suitable formula is selected on the basis of the information given by the user, and thus the formula describes the dependence between the measurement variable and the speed of the person according to the user information better than usual.

An advantage of the solution according to the invention is that it provides a rather simple method and a measuring arrangement that are well-suited for industrial mass production and yield accurate measurement results of the object's speed. User-specific information or user-specific teaching information enables good adaptation to the user's real situation. A significant advantage of the invention is that it eliminates the disadvantages caused by the fact that the measurement variable, such as the step time, changes as the speed of the object changes.

BRIEF DESCRIPTION OF THE DRAWINGS

The invention will be described in greater detail by means of preferred embodiments, with reference to the attached drawings, in which FIG. 4 is a block diagram of the signal processing members of a sensor which measures a measurement variable, FIG. 5 is a block diagram of a counter.

DETAILED DESCRIPTION OF THE INVENTION

Figure 6:
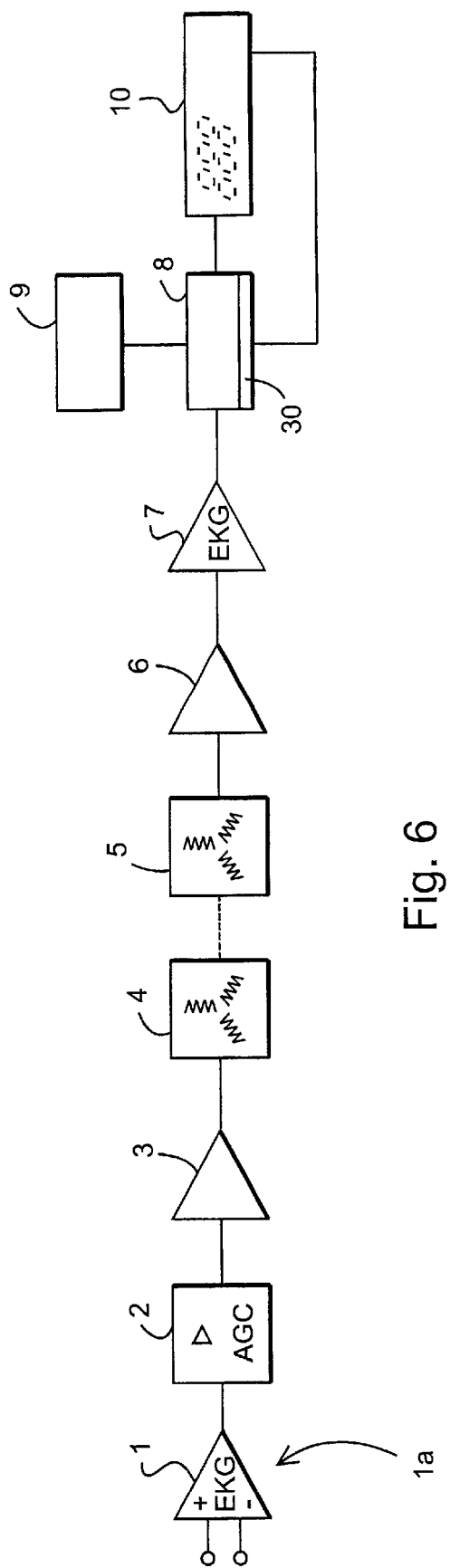
FIG. 6 illustrates a conventional arrangement for measuring the heart rate provided with the additional features of the invention.
Figure 7:
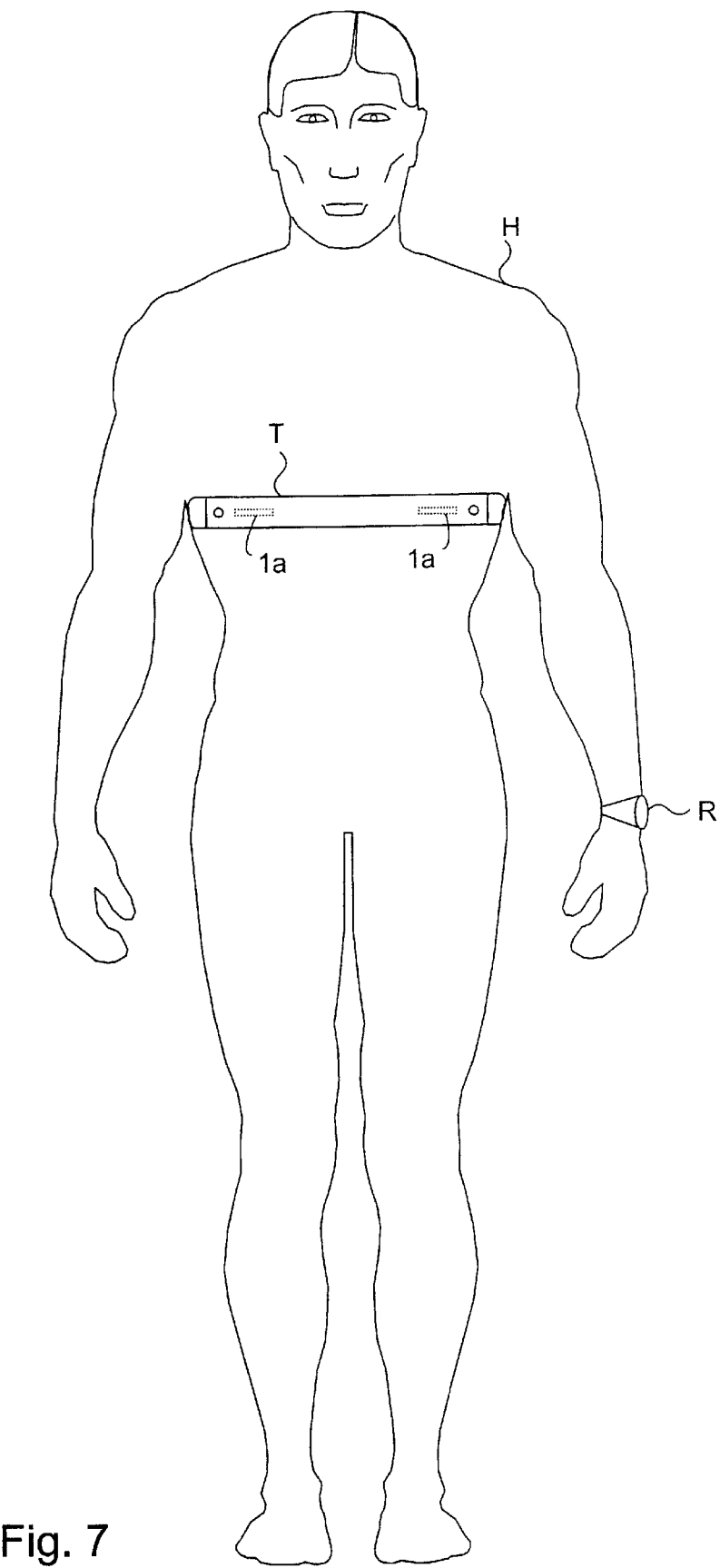
FIG. 7 illustrates a transmitter unit of the heart rate measuring arrangement around the user's chest and a receiver unit on the user's wrist.

Referring first to FIGS. 6 and FIG. 7, the invention is applicable especially in personal heart rate measuring arrangements, in particular in a receiver unit R of the heart rate measuring arrangement. In the telemetric heart rate measuring arrangement illustrated in FIG. 6 EKG electrodes 1a are connected to the differential input poles of an EKG pre-amplifier 1. The heart rate signal provided by the pre-amplifier 1 is amplified in an AGC amplifier 2, which is used for controlling a power amplifier 3, which generates a heart rate signal for controlling coils 4, the interval of the pulses in the signal being the same as the interval between the heart beats. Thus a magnetic field alternating at the heart rate is generated in the coils 4. Blocks 1 to 4 in FIG. 6 preferably form a telemetric transmitter unit T, such as a transmitter belt, which a person wears against his skin, e.g. against his chest. In FIG. 6 the other blocks starting from block 5 constitute a telemetric receiver unit R, which is preferably e.g. a receiver unit T to be worn on the wrist. The magnetic field received from the coil 4, i.e. detected by receiver coils 5, is amplified in a sensitive pre-amplifier 6, after which the signal is supplied to a signal amplifier 7. The amplifier's output signal is processed in a microcomputer 8, which calculates the average heart rate frequency from the desired number of pulses and shows it on a display 10, such as a liquid crystal display 10. The average heart rate frequency can also be stored in a memory 9. In respect of the above-mentioned elements 1 to 10, the device corresponds to prior art heart rate measuring devices. The block most essential to the present invention, which relates to the determination of a person's speed, is block 30, which is a calculating unit for determining the speed.

Figure 3:
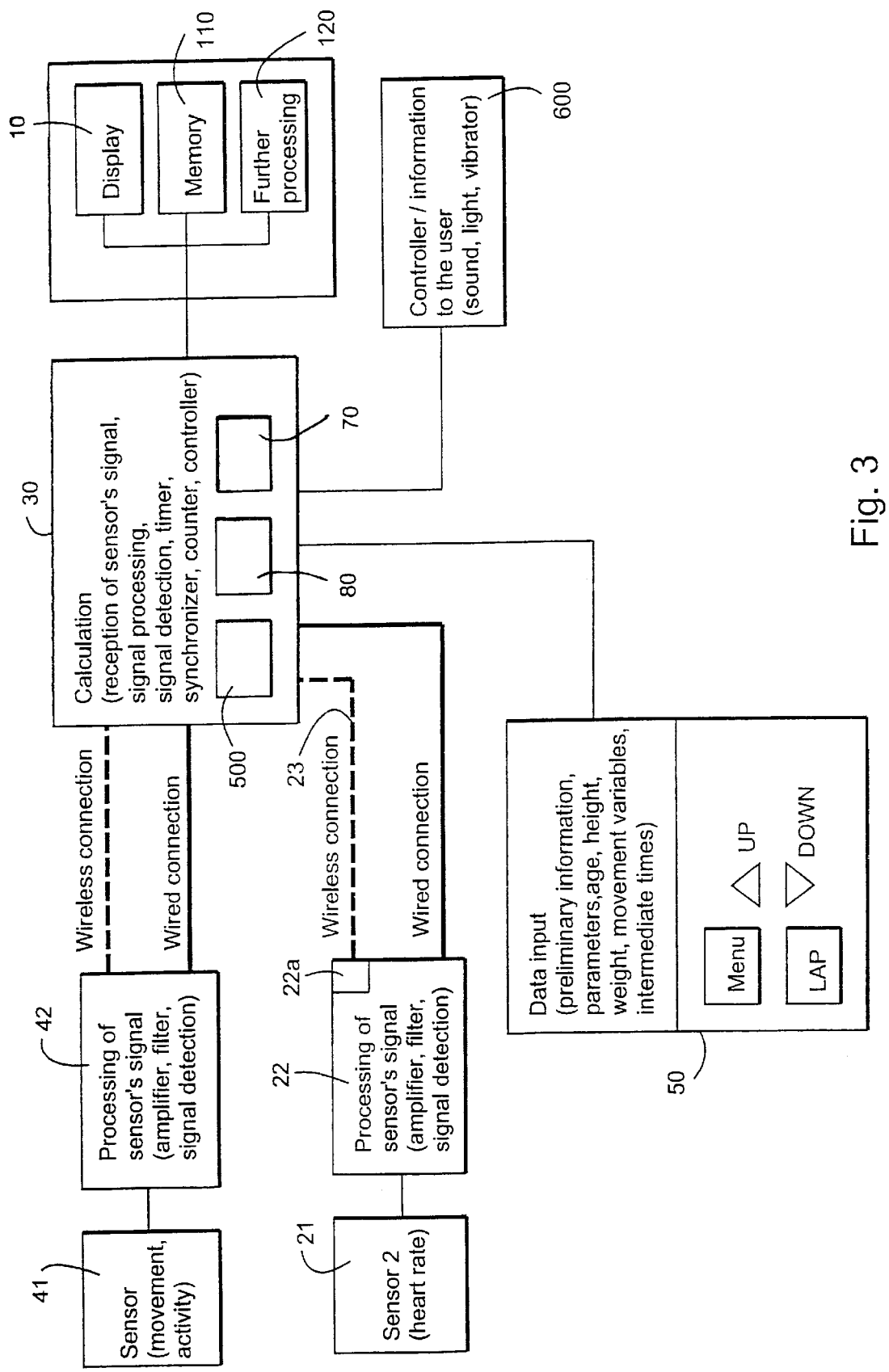
FIG. 3 illustrates a second embodiment of the measuring arrangement.

In FIG. 3 block 21 represents the heart rate measurement electrodes 1a of FIG. 6, and in FIG. 3 block 22 represents blocks 2 to 3 of FIG. 6, i.e. amplifiers, although in FIG. 6 block 22 also comprises a filter and a signal detector, which are not shown separately in FIG. 6. Block 22a of FIG. 3 represents a transmitter element, which corresponds to the coil 4 in the figure. In FIG. 3 'wireless connection' 23 means the wireless telemetric connection between the transmitter belt T and the receiver unit R according to FIGS. 6 and 7. In FIG. 3 'wireless connection' 24 means that the electrodes and the members processing the signal received from the electrodes may be in the same case as the receiver unit, such as the wrist unit R.

As stated above, the invention relates to a measuring arrangement for determining the speed of a runner, walker or another moving and living object H, such as a sports enthusiast. The measuring arrangement comprises a sensor 41 according to FIGS. 3 to 4 for measuring at least one measurement variable which is directly or indirectly related to the object's stepping and dependent on the speed of movement of the moving and living object H, e.g. a person H who exercises.

The measurement variable directly related to stepping means a measurement variable to be measured from the person's H leg. The indirect measurement variable related to stepping means a measurement variable to be measured from somewhere else than the leg, particularly a measurement variable to be measured from the hand. In a preferred embodiment the sensor 41 is in the wrist unit R of the heart rate measuring arrangement, which makes the heart rate measuring arrangement compact.

The measurement variable is preferably a variable obtained from a sensor measuring the person's H arm swing, i.e. a measurement variable indirectly related to stepping, because the sensor 41 can be easily integrated into the unit R worn on the wrist. One movement of the arm to and fro is preferably monitored, which corresponds to one pair of steps in the case of legs. This reduces the amount of measured data to half.

In another preferred embodiment of the invention one or more of the following is used as the measurement variable: step time, acceleration of leg in horizontal stepping, acceleration of leg in vertical stepping, average of step time, dispersion of successive step times. In that case the sensor is attached to the leg. To reduce the amount of measurement data to half, the measurement variable is preferably one of the following: time used for a pair of steps, average time used for a pair of steps, dispersion of successive times used for a pair of steps.

Figure 2:
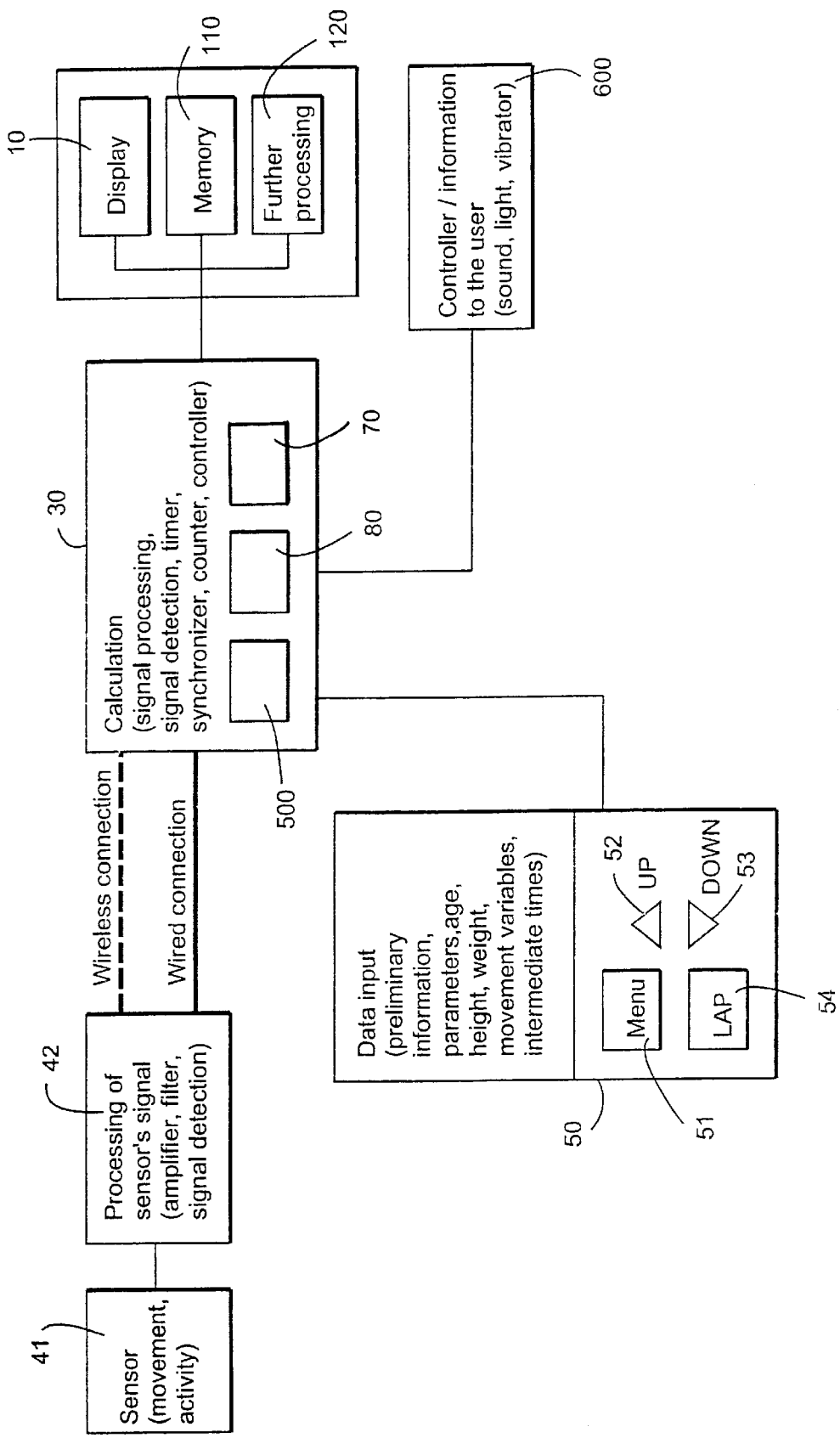
FIG. 2 illustrates a first embodiment of the measuring arrangement.

In the following, we will describe the first embodiment of the invention, which is related to a teaching function performed by the user. The measuring arrangement according to the invention also comprises a calculating unit 30, which determines the speed on the basis of the dependence between the measurement variable and the speed to be taught to the measuring arrangement and one or more members 50 for providing user-specific teaching information. Using the information providing member 50 and the above-mentioned sensor, which measures the measurement variable, as the source of user-specific teaching information, the dependence between the measurement variable and the speed is taught as a user-specific measurement formula to the measuring arrangement by means of the user-specific teaching information so that the speed can be determined by the calculating unit 30, which employs the formula. It should be noted that the user-specific information can be supplied to the measuring arrangement in various ways, e.g. by feeding a numerical value, or by selecting a suitable value from the values stored in the measuring arrangement by means of the UP and DOWN members 53–54 used in connection with the MENU member 51 of FIGS. 2 and 3 or by transmitting this value to the measuring arrangement e.g. wirelessly. In FIGS. 2, 3 and 5 the information providing member 50 also comprises a member 54 marked with LAP, which is used in the second version of the first embodiment, which will be described more closely below.

Figure 1:
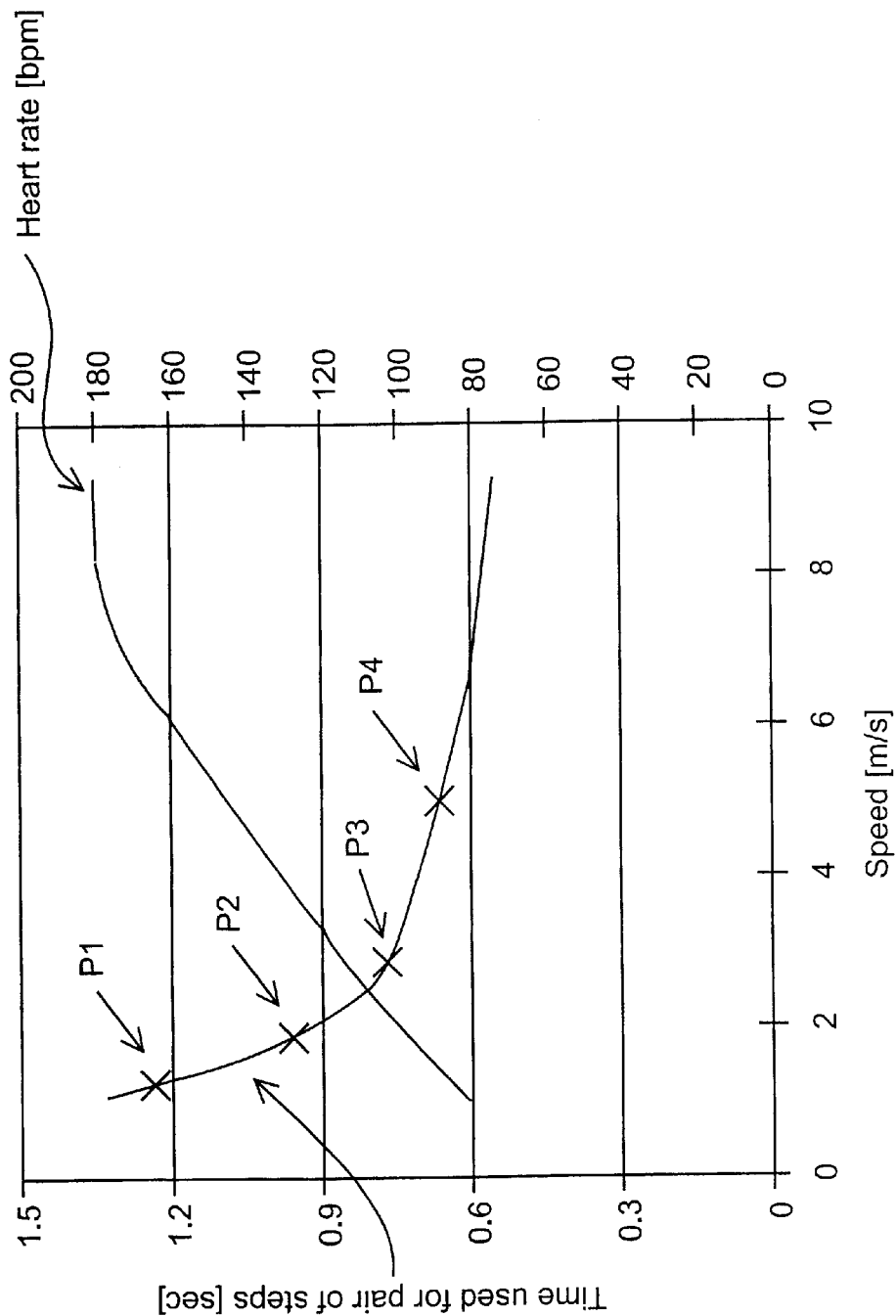
FIG. 1 illustrates the time used for a pair of steps and heart rate as the function of the object's speed.

In the actual determination of speed during use the method comprises measuring in a manner known per se at least one measurement variable which is related to the object's stepping directly or indirectly and dependent on the speed of movement of the moving and living object. The invention comprises teaching the dependence between the measurement variable and the speed as a user-specific formula to the measuring arrangement by means of the user-specific teaching,information as shown in FIG. 1 prior to the actual determination of speed during use, the formula being employed for the actual determination of speed during use.

Figure 9:
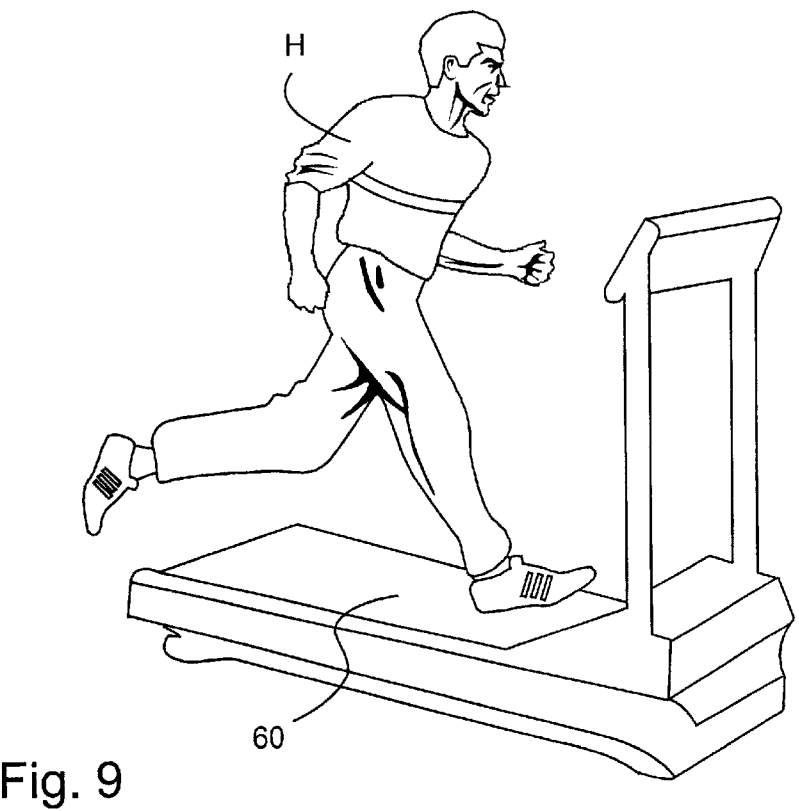
FIG. 9 illustrates a treadmill as a separate device which is used for obtaining speed measurements for teaching the measuring arrangement.

In the first version of the first embodiment the member 51 for providing teaching information in the measuring arrangement preferably comprises means 52 to 54 for supplying the object's speeds measured by a separate device 60 shown in FIG. 9 to the measuring arrangement. In the embodiment of FIG. 9 this device is preferably a treadmill. In this first version of the first embodiment the user-specific teaching information in the teaching phase consists of values of several speed measurements performed by a separate device 60 and values of the measurement variable, which are measured by a sensor 41 of the measuring arrangement, pair with the speed measurements and are directly or indirectly related to the stepping. In the teaching phase the person H supplies the values of speed measurements carried out by the separate device 60 to the measuring arrangement using the information providing members 51. The values of the measurement variable are measured by the measuring arrangement itself, i.e. by the sensor 41, which measures the measurement variable.

For obtaining sufficiently extensive and representative teaching measurements, the object preferably moves at various speeds in the teaching phase, e.g. at four speeds but at least at two speeds. The user H sets the treadmill or another exercise device 60 to move at four different speeds, e.g. at speeds of 1, 1.5, 2.5 and 5 m/s. The user performs 4 exercises, and thus we obtain a curve of four points shown in FIG. 1, in which each point P1 to P4 comprises the value of the speed and the value of the measurement variable obtained from the external speed measurement device 60 as well as the value of the measurement variable measured for each of the four exercises by the sensor 41 of the measuring arrangement.

The measuring arrangement, preferably the calculating unit 30 or a measuring arrangement connected to it, comprises an interpreter 70 which interprets the MENU member 51, particularly the number of keystrokes or other instances of activation of the MENU member 51. After the exercises for teaching have been completed using the device 60, the user H presses the MENU key 51 once, in which case the interpreter 70 interprets that values of the speeds of the teaching measurement are to be supplied, which the user obtained from the device 60 of FIG. 9, such as a treadmill, which was used for determining the speeds. By means of the UP and/or DOWN members 52 to 53 the user gives the speed values one after the other which he used on the treadmill 60. The measuring unit pairs the speed values with the corresponding values of the measurement variable. Thus the curve of FIG. 1 is stored in the measuring arrangement in the first embodiment, preferably in the calculating unit 30, as a mathematical function since the dependence between the measurement variable and the speed can be presented in the form of a formula by means of the points P1 to P4. The minimum number of points needed for a sufficient formula is two, but the applicant has noticed that the use of more points than two improves accuracy.

In the second version of the first embodiment the method preferably comprises the object traveling one or more distances of a known length in the teaching phase, the total number of distances traveled being at least two. This means that the person performs several or at least two exercises. The known distance may be e.g. the distance between telephone poles, which is e.g. 25 m or 50 m. The time used for traveling the distance is measured simultaneously each time the object travels the distance. The teaching information employed in the method consists of the known length of the distance, the times used for the distance and values of the measurement variable, which are measured by. the sensor 41 of the measuring arrangement, are directly or indirectly related to stepping and correspond to the times used for,the distance. As regards the structure of the measuring arrangement, the member 50 for providing teaching information comprises means 51 to 53 for supplying the known length of one or more distances traveled to the measuring arrangement. On the other hand, the member 50 for providing teaching information in the measuring arrangement comprises means 51 to 53 for supplying the times used for one or more distances of a known length, at least for two separate distances, to the measuring arrangement using members 51, 54 and 80.

As appears from the numbering 51 to 53 above, in the second version of the first preferred embodiment the same members 50, 51 to 53 may be used for supplying the length of the known distance to the measuring arrangement as for supplying the speed to the user from the separate device 60 in the first version of the first embodiment.

After the exercises of traveling one or more known distances, e.g. the distance between telephone poles, have been completed, the known distance is supplied as follows, for. instance: the user H presses the MENU key 51 e.g. twice, in which case the interpreter 70 interprets that the known length of a distance obtained from the teaching measurement is to be supplied, or lengths in the case of known distances with different lengths. Using the UP and/or DOWN members 52 to 53 the user gives the length of one or more known distances successively, e.g. the same distance of 25 m is/was used in both exercises.

It appears from FIGS. 2 to 3 and 5 that the means for supplying the times used for at least two separate distances to the measuring arrangement comprise a timing device 80 included in the measuring arrangement and a user interface 54 controlling it, the user interface being marked with LAP, too. The LAP function, i.e. the function for taking the intermediate time, or another stopwatch-type function of the heart rate measuring device R is preferably utilized by pressing the MENU member 51 e.g. three times, in which case the interpreter 70 interprets that the times of the teaching measurements related to the time used for a known distance are to be supplied. When the user starts traveling the known distance, he presses the LAP member 54, and when the distance has been covered, the user presses the LAP member 80 to stop. The measuring arrangement divides the known distance, e.g. 25 m, with the time measured by the measuring arrangement and obtains speed readings the number of which corresponds to the number of times the distance was traveled. The measuring arrangement has measured the measurement variables corresponding to the speeds, such as the number of arm swings, by the sensor 41 as the user H has traveled the known distance. The measuring unit pairs the speed values with the corresponding values of the measurement variable. Thus the curve of FIG. 1 has been stored in the measuring arrangement, preferably in the calculating unit 30 in the first embodiment, as a mathematical function, since the dependence between the measurement variable and the speed can be presented in the form of a formula by means of the points P1 to P4. Naturally the known length of the distance can be supplied to the measuring arrangement in advance before the person starts to travel the known distance.

The supply of speed information in the first version of the first embodiment and the supply of the length of the known distance in the second version of the first embodiment as well as the supply of other information by the user can be performed by feeding a numerical value or by selecting a suitable value from the values stored in the measuring arrangement by means of the UP and DOWN members 52 to 53 used in connection with the MENU member 51 of FIGS. 2 to 3, or by transmitting the value to the measuring arrangement e.g. wirelessly or in another way. When the UP and DOWN members 52 to 53 are used in the first version or the first embodiment, the speed values may be stored e.g. at intervals of 0.5 m/s, and the user selects the correct values by means of the members 52 to 53. In the second version of the first embodiment the known lengths of distances may be stored at intervals of 25 m and the members 52 to 53 are used for finding the correct length.

In the teaching phase of the method the times used for traveling a known distance are preferably measured by the measuring arrangement itself and the length of the known distance, e.g. 25 m, is supplied to the measuring arrangement.

To provide extensive teaching and an accurate formula, the method preferably comprises the object traveling the known distance at various speeds in the teaching phase.

As regards one or more known distances used in the first embodiment, it should be noted that preferably one and the same distance is used, but it is covered several times, at least twice. An advantage is that only one value of distance length needs to be supplied. Alternatively, two or more distances of different lengths may be used, but the total number of distances traveled has to be at least two.

Figure 10:
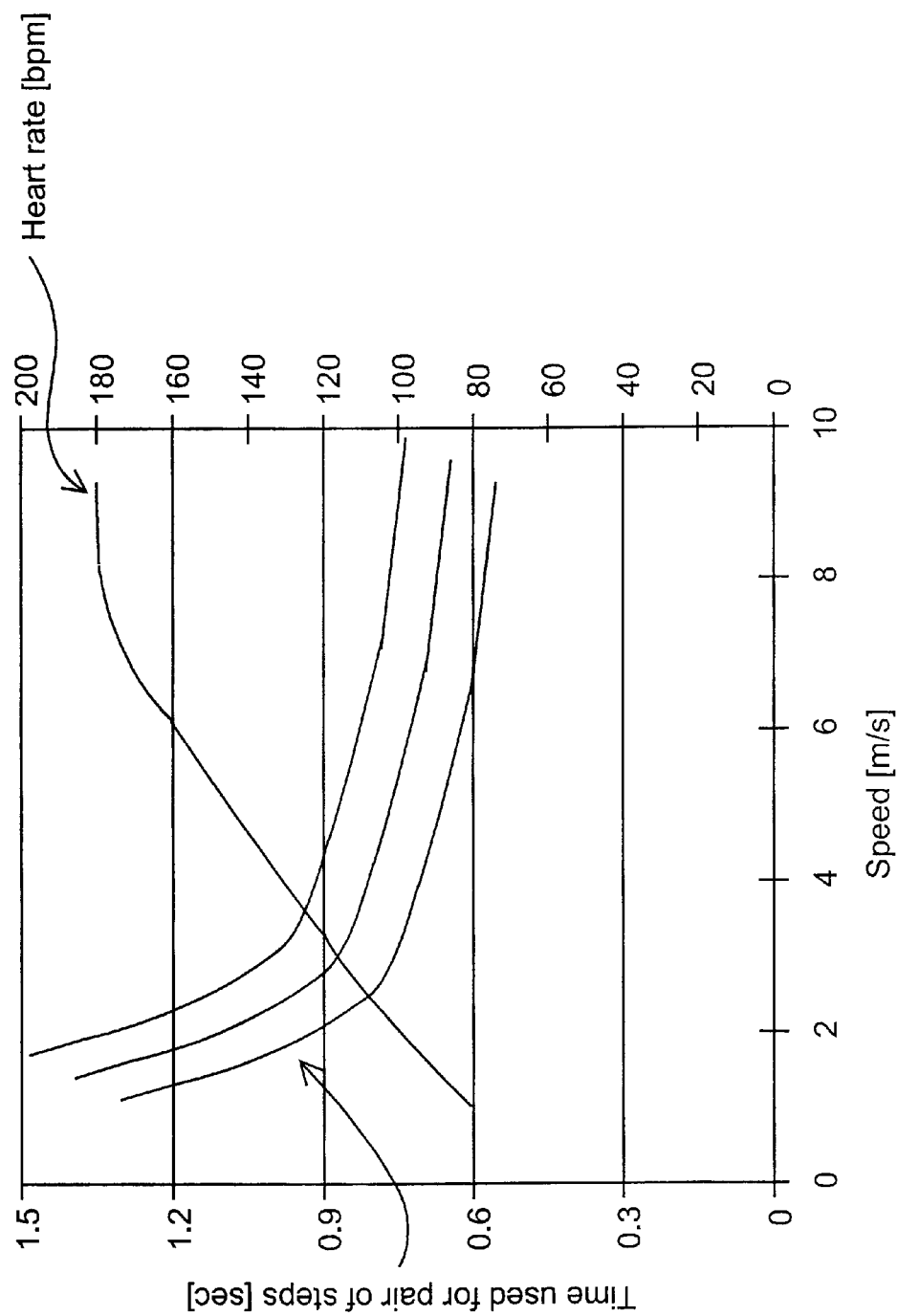
FIG. 10 illustrates several curves representing the pair of steps and the heart rate as the function of the object's speed.

In the following we will describe the second embodiment of the invention. The graph of the dependence between the measurement variable and the speed related to this embodiment is illustrated by three curves in FIG. 10. The structure of the measuring arrangement will be described with reference to the same figures as above, i.e. to FIGS. 2 to 6.

The embodiment relates to a measuring arrangement for determining the speed of a runner, walker or another moving and living object H. The measuring arrangement comprises a sensor 41 for measuring at least one measurement variable which is directly or indirectly related to the object's stepping and dependent on the speed of movement of the moving and living object. An essential feature of the second embodiment is that the measuring arrangement comprises a calculating unit 30, which determines the speed on the basis of the dependence between the measurement variable and the speed stored in advance in the measuring arrangement, and one or more information providing members 50, 51 to 53, which are connected to the calculating unit 30 and supply user-specific information. It is also essential that the members 50, 51 to 53 for providing information are used for specifying the dependence between the measurement variable and the speed with user-specific information to be supplied to the measuring arrangement to create, select or otherwise generate a user-specific formula so that the speed can be determined by the calculating unit 30, which employs the formula. In this second embodiment the measuring arrangement, preferably the calculating unit, contains complete formulae, i.e. the graph of the dependence between the measurement variable and the speed shown in FIG. 10. The invention comprises selecting, on the basis of the information provided by the user, a suitable formula which represents the dependence between the measurement variable and the speed of the user in accordance with the user information better than usual. The speed is calculated using this more optimal formula. In the second embodiment the method comprises specifying the dependence between the measurement variable and the speed stored in the measuring arrangement in advance with the user-specific information to be supplied to the measuring arrangement, and using the dependence between the measurement variable and the speed known in advance and the user-specific information for creating, selecting or otherwise generating a user-specific formula, which is used for the actual determination of speed during use.

The user-specific information, which is supplied to the measuring arrangement and used in the determination of speed, preferably consists of one or more of the following: the person's H age, weight, height, sex, foot size. In the preferred embodiment the formula chiefly has the following form:

$$\text{speed} = A/(k^* \text{measurement variable} + B)$$

where the value of one or more factors A, B, k is dependent on the user-specific information or additional information supplied.

Both above-mentioned principal embodiments have similarities with some preferred embodiments related to the details. Referring to FIGS. 2 to 3, the measuring arrangement preferably comprises a display 10. Thus the speed of the object determined by the method is shown on the display 10 included in the measuring arrangement, the display being the same as that in the actual wrist unit R of the heart rate meter. The measuring arrangement preferably comprises a memory 110, and thus the method comprises storing the speed of the object determined by the method in the memory of the measuring arrangement. It is also possible that the method preferably comprises a transmission part 120, which transmits the speed of the object determined in the calculating unit 30 to further processing, e.g. to a microcomputer or to another external data processing device.

Referring again to the first embodiment, it should be noted that the preferred embodiment of the first embodiment may comprise, in addition to the teaching function, members 50, 51 to 53 for providing information on the user H to the measuring arrangement. The user-specific additional information used for specifying the first embodiment may be the same information that was used as the user-specific information in the second embodiment.

The heart rate can also regarded as a measurement variable which is indirectly related to the stepping, as shown in FIG. 1. Furthermore, the heart rate can be used as information or additional information in the determination of speed.

Referring to the figures, the measuring arrangement is a personal heart rate measuring arrangement carried by the person H and the wrist unit R for receiving information on the heart rate is the part of the heart rate measuring arrangement that includes the calculating unit 30, which determines the speed. The sensor 41, which measures the measurement variable, is preferably provided in the wrist unit for receiving the heart rate, i.e. referring to FIGS. 2 and 3 there is a wired connection, and the sensor 41 and the signal processing means 42 are in the same case as the receiving unit.

FIG. 4 illustrates the wrist unit related to the sensor 41, which measures the measurement variable, in greater detail. The solution of FIG. 4 comprises an amplifier 201 which receives the measuring signal, a filter 202 connected to the amplifier, a signal processor/detector 203 connected to the filter and a data transmission member 204 which is connected to the signal processor/detector and transmits information to the calculating unit 30 in accordance with FIGS. 2 to 3.

FIG. 5 illustrates the structure of the core components of the measuring arrangement. In FIG. 5 the measuring arrangement comprises a signal receiver 301 for receiving the signal related to the measurement variable from the measuring sensor 41. The measuring arrangement also comprises a signal receiver 302 for receiving the signal related to the measurement variable from the heart rate measuring sensor 21. In addition, the measuring arrangement preferably comprises a receiver 303 for receiving other information. The arrangement further comprises a member 304 for signal and data processing which is common to all the above-mentioned blocks 301 to 303. This member 304 is in contact with the actual calculating unit 30. A timer 80 controlled by the LAP member 54 is connected to the calculating unit.

Figure 8:
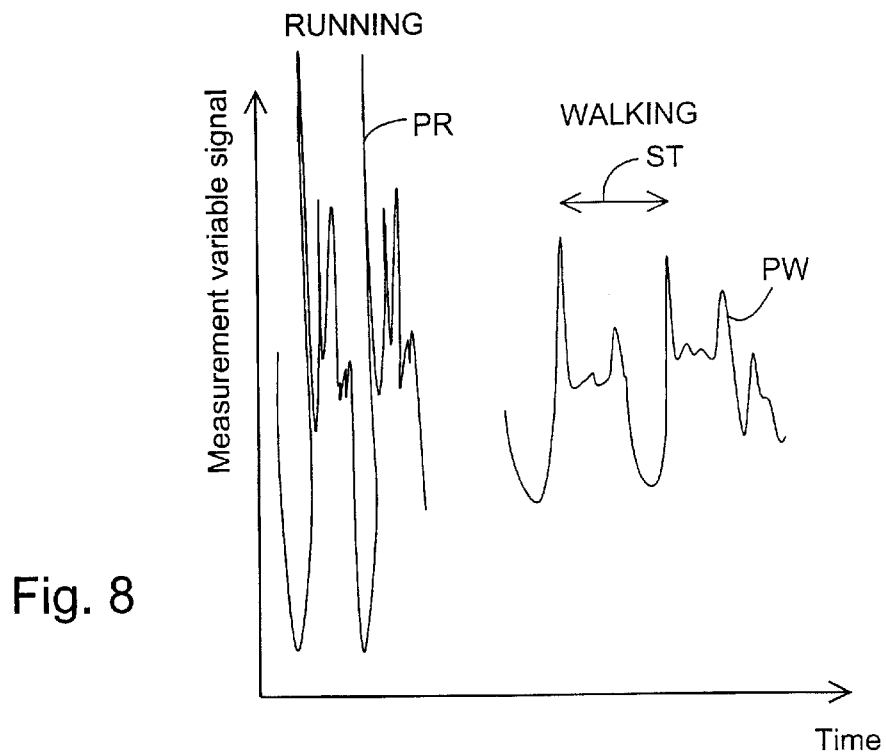
FIG. 8 illustrates a measurement variable signal for walking and running.

The measuring arrangement preferably comprises means 500 for detecting before the determination of speed whether the object is running or walking. The means for detecting whether the object is running or walking are arranged to control the selection, formation or another kind of generation of the formula used to determine the speed. The method preferably employs a different formula for walking than for running in the actual determination of speed. The fact whether the object is running or walking is preferably determined on the basis of the above-mentioned measurement variable and/or another measurement variable. Referring to FIG. 8, the method preferably comprises determining whether the object is walking or running on the basis of said measurement variable and/or the pulse form and/or the amplitude of another measurement variable. It is seen in FIG. 8 that when the object is running, the ascending edge of the pulse PR is steeper in running than the ascending edge of the pulse PW in walking.

The essential parts of the measuring arrangement described in the application can be implemented using separate components, integrated circuits, proper ASIC circuits, software or a desired combination of these.

It will be obvious to a person skilled in the art that, as the technology advances, the inventive concept can be implemented in various ways. The invention and its embodiments are not limited to the examples described above but may vary within the scope of the claims.

What is claimed is:

1. A method of determining the speed of a runner, walker or another moving and living object by a measuring arrangement, the method comprising:

measuring at least one measurement variable during an actual determination of speed, said at least one measurement variable being directly or indirectly related to the stepping of the object and dependent on the speed of movement of the moving and living object;

teaching the dependence between the measurement variable and the speed as a user-specific formula to the measuring arrangement at least once before the actual determination of speed during use by means of user-specific teaching information; and using said formula for the actual determination of speed.

2. A method of determining the speed of a runner, walker or another moving and living object by a measuring arrangement, the method comprising:

measuring at least one measurement variable during an actual determination of speed, said at least one measurement variable being directly or indirectly related to the stepping of the object and dependent on the speed of movement of the moving and living object;

specifying and storing the dependence between the measurement variable and the speed in the measuring arrangement in advance with user-specific information;

forming, selecting or otherwise generating a user-specific formula by means of said known dependence between the measurement variable and the speed and the user-specific information; and using said formula for the actual determination of speed.

3. A method according to claim 1, wherein values of several speed measurements to be performed by a separate device and values of the measurement variable, which are measured by the measuring arrangement, are directly or indirectly related to the stepping and pair with the speed measurements are used as the user-specific teaching information in the teaching phase.

4. A method according to claim 3, wherein in the teaching phase the values of the speed measurements performed by a separate device are supplied to the measuring arrangement, and that the values of the measurement variable are measured by the measuring arrangement itself.

5. A method according to claim 3, wherein in the teaching phase the object moves at various speeds.

6. A method according to claim 1, wherein in the teaching phase the object travels one or more distances with a known length so that the total number of distances traveled is at least two, and that the time used for each distance is measured simultaneously each time the distance is traveled, and that the teaching information of the method comprises the known length of the distance and the times used for the distances and values of the measurement variable which are measured by the measuring arrangement, are directly or indirectly related to stepping and correspond to the known length of the distance and the times used for the distance.

7. A method according to claim 6, wherein in the teaching phase the times used for the known distance are measured by the measuring arrangement itself.

8. A method according to claim 6, wherein in the teaching phase the length of the known distance is supplied to the measuring arrangement.

9. A method according to claim 6, wherein in the teaching phase the object moves the known distance at various speeds.

10. A method according to claim 1 or 2, wherein in the actual determination of speed the method employs a different formula for walking than for running.

11. A method according to claim 1 or 2, wherein in the actual determination of speed the method comprises determining whether the object it walking or running on the basis of said measurement variable and/or another measurement variable.

12. A method according to claim 1 or 2, wherein in the actual determination of speed the method comprises determining whether the object is walking or running on the basis of said measurement variable and/or the pulse form and/or the amplitude of another measurement variable.

13. A method according to claim 10, wherein the formula used for determining the speed is selected depending on whether the object was walking or running.

14. A method according to claim 11, wherein the other measurement variable, which the method employs and the value of which is used for determining whether the object is walking or running, is the heart rate information measured from then object's body.

15. A method according to claim 1, wherein user-specific additional information is also used in the determination of speed, and this information is supplied to the measuring arrangement.

16. A method according to claim 15, wherein the user-specific additional information used in the determination of speed consists of one or more of the following: age, weight, height, sex, foot size.

17. A method according to claim 2, wherein the user-specific information used in the determination of speed consists of one or more of the following: age, weight, height, sex, foot size.

18. A method according to claim 1 or 2, wherein the measuring arrangement in which the method is applied is a personal heart rate measuring arrangement carried by the object.

19. A method according to claim 1 or 2, wherein the measuring arrangement in which the method is applied is a personal heart rate measuring arrangement which is carried by the object, and the wrist unit for receiving the heart rate in the heart rate measuring arrangement is the part where the speed is determined.

20. A method according to claim 1 or 2, wherein the speed of the object determined by the method is shown on a display included in the measuring arrangement.

21. A method according to claim 1 or 2, wherein the speed of the object determined by the method is stored in the memory of the measuring arrangement.

22. A method according to claim 1 or 2, wherein the speed of the object determined by the method is transmitted to further processing.

23. A method according to claim 1 or 2, wherein the measurement variable is one or more of the following: step time, acceleration of leg in horizontal stepping, acceleration of leg in vertical stepping, average of step time, dispersion of successive step times.

24. A method according to claim 1 or 2, wherein the measurement variable is a measurement variable which is obtained from a sensor which measures the arm swings, thus being indirectly related to the stepping.

25. A method according to claim 1 or 2, wherein the measurement variable is one or more of the following: time used for a pair of steps, average time used for a pair of steps, dispersion of successive times used for a pair of steps.

26. A method according to claim 2 or 15, wherein the formula at least chiefly has the form:

$$speed = A/(k^* \text{ measurement variable} + B)$$

where the value of one or more factors A, B, k is dependent on the user-specific information or additional information supplied.

27. A measuring arrangement for determining the speed of a runner, walker or another moving and living object, the measuring arrangement comprising a sensor for measuring at least one measurement variable which is directly or indirectly related to the object's stepping and dependent on the speed of movement of the moving and living object, the measuring arrangement also comprising a calculating unit, which determines the speed on the basis of the dependence between the measurement variable and the speed to be taught to the measuring arrangement, and one or more members in contact with the calculating unit for providing user-specific teaching information, and the dependence between the measurement variable and the speed being taught as a user-specific formula to the measuring arrangement using the teaching information and said sensor which measures the measurement variable as a source of user-specific teaching information for determining the speed with said calculating unit, which employs the formula.

28. A measuring arrangement according to claim 27, wherein the means for providing teaching information in the measuring arrangement comprises member for supplying the speeds of the object measured with a separate device to the measuring arrangement.

29. A measuring arrangement according to claim 27, wherein the member for providing teaching information in the measuring arrangement comprises means for supplying the known length of one or more distances to be traveled to the measuring arrangement.

30. A measuring arrangement according to claim 29, wherein the member for providing teaching information in the measuring arrangement comprises means for supplying the times used for one or more distances of known length, at least for two separate distances, to the measuring arrangement.

31. A measuring arrangement according to claim 30, wherein the means for supplying the times used for at least two separate distances to the measuring arrangement comprise a timing device included in the measuring arrangement and a user interface for controlling it.

32. A measuring arrangement for determining the speed of a runner, walker or another moving and living object, the measuring arrangement comprises a sensor for measuring at least one measurement variable which is directly or indirectly related to the object's stepping and dependent on the speed of the moving and living object, the measuring arrangement also comprising a calculating unit which determines the speed on the basis of the dependence between the measurement variable and the speed stored in the measuring arrangement in advance, and one or more members in contact with the calculating unit for supplying user-specific information to the measuring arrangement, the user-specific information being used for specifying the dependence between the measurement variable and the speed to create, select or otherwise generate a user-specific formula for determining the speed by the calculating unit, which employs the formula.

33. A measuring arrangement according to claim 32, wherein the measuring arrangement is a personal heart rate measuring arrangement carried by the object.

34. A measuring arrangement according to claim 32, wherein the measuring arrangement is a personal heart rate measuring arrangement carried by the object, and the wrist unit for receiving information on the heart rate included in the heart rate measuring arrangement is the part that contains the calculating unit, which determines the speed.

35. A measuring arrangement according to claim 34, wherein the sensor, which measures the measurement variable, is in the wrist unit for receiving the heart rate.

36. A measuring arrangement according to claim 32, wherein the measuring arrangement comprises means for detecting whether the object is running or walking before the speed is determined.

37. A measuring arrangement according to claim 36, wherein the means for detecting whether the object is running or walking are arranged to control the selection, creation or another kind of generation of the formula used in the determination of speed.

38. A measuring arrangement according to claim 32, wherein the formula at least chiefly has the following form:

$$speed = A/k(k*measurement\ variable + B)$$

where the value of one or more factors A, B, k is dependent on the user-specific information supplied.

39. A method according to claim 11, wherein the formula used for determining the speed is selected depending on whether the object was walking or running.

* * * * *